United States Patent
Otsubo et al.

[11] 3,777,719
[45] Dec. 11, 1973

[54] EXHAUST SYSTEM FOR MULTI-ROTOR TYPE ROTARY INTERNAL COMBUSTION ENGINE

[75] Inventors: Kizuki Otsubo; Yoshikazu Ishikawa, both of Tokyo, Japan

[73] Assignee: Nissan Motor Company Limited, Yokohama City, Japan

[22] Filed: Aug. 31, 1972

[21] Appl. No.: 285,349

[30] Foreign Application Priority Data
Sept. 1, 1971   Japan............................... 46/78926

[52] U.S. Cl.................................. 123/8.07, 60/323
[51] Int. Cl............................................ F02b 53/04
[58] Field of Search................. 123/8.07, 8.01, 8.45; 60/323

[56] References Cited
UNITED STATES PATENTS
3,476,092   11/1969   Yamamoto..................... 123/8.07 X Primary Examiner—Carlton R. Croyle
Assistant Examiner—Michael Koczo, Jr.
Attorney—John Lezdey et al.

[57] ABSTRACT

A rotary internal combustion engine of the multi-rotor type having a plurality of rotor chambers including exhaust chambers provided with exhaust ports respectively. The rotary internal combustion engine has an exhaust system constituted by exhaust passageways formed to be congregated in one portion of a rotor housing and communicating with the exhaust ports leading from the respective rotor exhaust chambers, and at least one exhaust manifold connected at one portion of the rotor housing to the exhaust passageways.

3 Claims, 5 Drawing Figures

PATENTED DEC 11 1973 3,777,719

EXHAUST SYSTEM FOR MULTI-ROTOR TYPE ROTARY INTERNAL COMBUSTION ENGINE

This invention relates to rotary internal combustion engines and, more particularly, to an exhaust system for a multi-rotor type rotary internal combustion engine.

In a conventional rotary internal combustion engine of the above-described type, it is a common practice to have rotor exhaust chambers provided with exhaust ports which are separately connected to exhaust manifolds leading to exhaust pipes, respectively. With this arrangement, each of the exhaust manifold is subjected to excessively high temperature and, therefore, the thermal expansion thereof becomes relatively large because of hot exhaust gases pass therethrough and the exhaust manifold is not cooled. On the other hand, since the rotor housing is continuously cooled throughout various operating conditions of the engine, the temperature of the rotor housing does not increase beyond a predetermined level and, accordingly, the thermal expansion thereof is relatively small. If, in this instance, the exhaust manifold is connected to the rotor housing by means of suitable fastener means such as bolts, the connecting portion between the exhaust manifold and the rotor housing is subjected to high mechanical stresses due to different thermal expansions. This problem will be more serious especially where a thermal reactor is mounted on the rotor housing because the thermal reactor is very rigid and the temperature thereof is relatively high due to the thermal reaction of the exhaust gases passing therethrough.

In order to solve this problem, it has heretofore been proposed to provide large bores in the exhaust manifold for insertion of mounting bolts so that the exhaust manifold and the rotor housing can slide with respect to each other when the difference in thermal expansions becomes great. Another expedient which has been proposed is to employ an exhaust manifold which has low rigidity so that, when the difference in thermal expansions between the exhaust manifold and the rotor housing becomes great, the exhaust manifold is readily deformed to prevent the connecting portion between the exhaust manifold and the rotor housing from being subjected to high mechanical stresses. Since, however, the exhaust ports are separately formed in different positions of the rotor housing, the exhaust manifolds or thermal reactors should be mounted on the rotor housing at different positions so as to communicate with each exhaust port, thus resulting in a complicated construction.

It is, therefore, an object of the present invention to provide an improved exhaust system for a multi-rotor type rotary internal combustion engine.

Another object of the present invention is to provide an exhaust system for a multi-rotor type rotary internal combustion engine, which exhaust system is simplified in construction and economical to manufacture.

According to the present invention, there is provided an exhaust system for a multi-rotor type rotary internal combustion engine wherein exhaust passageways communicating with each exhaust port leading from each rotor exhaust chamber are congregated in one portion of a rotor housing so that one or more than one exhaust manifold or thermal reactor can be connected to the exhaust passageways at one position of the rotor housing.

These and other features and advantages of the present invention will become more apparent from the following description when taken in conjunction with the accompanying drawings in which like component parts are designated by same reference numerals and in which.

Figure 1:
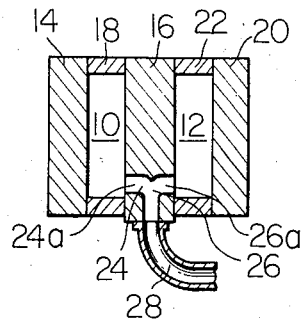
FIG. 1 is a cross sectional view showing one preferred embodiment of an exhaust system for a rotary internal combustion engine of the multi-rotor type according to the present invention.

Referring now to the drawings and more particulary to FIG. 1, there is shown in section a two-rotor type rotary internal combustion engine incorporating the exhaust system according to the present invention. The rotary internal combustion engine of this type includes, as customary, two rotor exhaust chambers 10 and 12 in which rotors are rotatably disposed respectively, though not shown. The rotor chamber 10 is defined by side housings 14 and 16 and a central housing 18, whereas the rotor chamber 12 is defined by side housings 16 and 20 and a central housing 22. The housings 14, 16, 18, 20 and 22 form a general rotor housing as will be described. It should be noted that intake ports of the rotor chambers 10 and 12 are herein omitted for the sake of simplicity of illustration.

Figure 2:
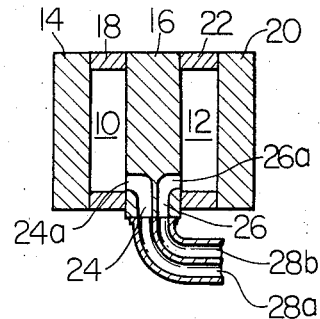
FIG. 2 is a cross sectional view showing another preferred embodiment of an exhaust system for a rotary internal combustion engine of the multi-rotor type according to the present invention.
Figure 3:
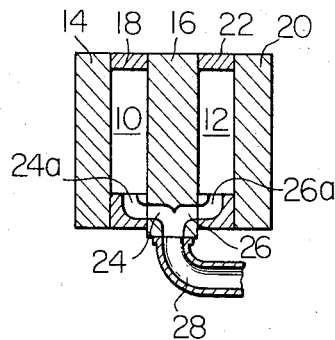
FIG. 3 is a cross sectional view showing still another preferred embodiment of an exhaust system for a rotary internal combustion engine of the multi-rotor type according to the present invention.
Figure 4:
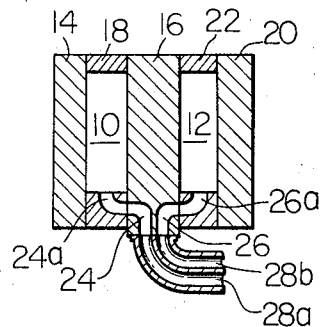
FIG. 4 is a cross sectional view showing a further embodiment of an exhaust system for a rotary internal combustion engine of the multi-rotor type according to the present invention.

It is an important feature of the present invention that exhaust passageways communicating with each exhaust port leading from each rotor exhaust chamber are formed to be congregated in one portion of the rotor housing whereby the exhaust manifold or manifolds can be connected to the exhaust passageways at one portion of the rotor housing. In the embodiment of FIG. 1, the exhaust passageways 24 and 26 are congregated in the side housing 16 intervening between the rotor chambers 10 and 12. The exhaust passageways 24 and 26 communicate with exhaust ports 24a and 26a formed in the side housing 16 and opening to the rotor exhaust chambers 10 and 12, respectively. Moreover, the exhaust passageways 24 and 26 are joined at their end portions so that an exhaust manifold 28 can be connected to the exhaust passageways 24 and 26 at one position of the rotor housing. In the embodiment of FIG. 2, the exhaust passageways 24 and 26 communicating with exhaust ports 24a and 26a, respectively, are separately formed but congregated in one part of the side housing 16 so that exhaust manifolds 28a and 28b can be connected to the exhaust passageways 24 and 26 at one part of the side housing 16. The exhaust ports 24a and 26a may be formed in the central housings 18 and 22, respectively, so as to open to the rotor exhaust chambers 10 and 12 and communicate with the exhaust passageways 24 and 26, respectively, formed in the side housing 16 as seen in FIGS. 3 and 4. In the embodiment of FIG. 3, the exhaust passageways 24 and 26 are joined at their end portions while, in the embodiment of FIG. 4, the exhaust passageways 24 and 26 are separately formed but congregated in the side housing 16 as previously mentioned.

Figure 5:
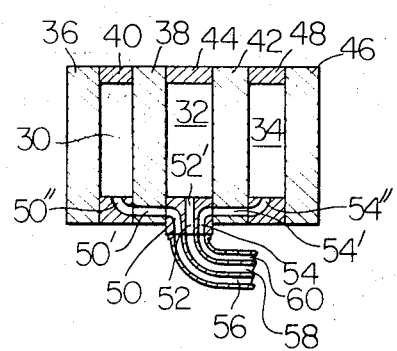
FIG. 5 is a cross sectional view showing a still further embodiment of an exhaust system for a rotary internal combustion engine of the multi-rotor type according to the present invention.

Referring next to FIG. 5, there is shown in section a three-rotor type rotary internal combustion engine incorporating the exhaust system according to the present invention. The rotary internal combustion engine of this kind includes, as customary, first, second and third rotary exhaust chambers 30, 32 and 34 in which rotors are rotatably disposed in a known fashion, though not shown. The first rotor exhaust chamber 30 is defined by side housings 36 and 38 and a central housing 40. The second rotor exhaust chamber 32 is defined by side housings 38 and 42 and a central housing 44. The third rotor exhaust chamber 34 is defined by side housings 42 and 46 and a central housing 48. It should be noted that each of intake ports of the first, second and third rotor exhaust chambers 30, 32 and 34 is herein omitted for the sake of simplicity of illustration. In this illustrated embodiment, exhaust passageways 50, 52 and 54 are formed to be congregated in one part of the central housing 44 intervening between the adjacent side housings 38 and 42. The exhaust passageway 50 communicates through an exhaust passageway 50' formed in the side housing 38 intervening between the rotor exhaust chambers 30 and 32 with an exhaust port 50'' formed in the central housing 40 intervening between the adjacent side housings 36 and 38 and communicating with the first rotor exhaust chamber 30. The exhaust passageway 52 communicates with the second rotor exhaust chamber 32 through an exhaust port 52'. The exhaust passageway 54 communicate through an exhaust passageway 54' formed in the side housing 42 intervening between the rotor exhaust chambers 32 and 34 with an exhaust port 54'' formed in the central housing 48 intervening between the adjacent side housings 42 and 46 and communicating with the third rotor exhaust chamber 34. These exhaust passageways 50, 52 and 54 are connected at one portion of the center housing 44 to exhaust manifolds or connecting pipes 56, 58 and 60 leading to thermal reactors (not shown), respectively.

It will now be understood from the foregoing description that the exhaust system implementing the present invention has exhaust passageways which are formed together or congregated in one part of the rotor housing whereby exhaust manifolds or thermal reactors can be connected to the exhaust passageways at one portion of the rotor housing.

What is claimed is:

1. An exhaust system for a multi-rotor type rotary internal combustion engine having a plurality of housing means defining therein rotor chambers including exhaust chambers having exhaust ports respectively, said exhaust system comprising exhaust passageways formed to be congregated in one portion of one of said housing means and communicating with said exhaust ports of said rotor exhaust chambers, and at least one exhaust manifold connected at one portion of said one of said housing means to said exhaust passageways.

2. An exhaust system as claimed in claim 1, wherein said exhaust passageways are joined at their end portions in said one of said housing means.

3. An exhaust system as claimed in claim 1, wherein said exhaust passageways are separately formed but congregated in said one of said housing means.

* * * * *